J. C. WOODSON.
ELECTRICALLY HEATED BAKE OVEN.
APPLICATION FILED SEPT. 24, 1920.

1,378,080. Patented May 17, 1921.

WITNESSES:
H. T. Shelhamer
L. M. Biebel

INVENTOR
James C. Woodson
BY
Wesley G. Carr
ATTORNEY.

UNITED STATES PATENT OFFICE.

JAMES C. WOODSON, OF MANSFIELD, OHIO, ASSIGNOR TO WESTINGHOUSE ELECTRIC PRODUCTS COMPANY, A CORPORATION OF MICHIGAN.

ELECTRICALLY-HEATED BAKE-OVEN.

1,378,080.     Specification of Letters Patent.     Patented May 17, 1921.

Application filed September 24, 1920. Serial No. 412,485.

*To all whom it may concern:*

Be it known that I, JAMES C. WOODSON, a citizen of the United States, and a resident of Mansfield, in the county of Richland and State of Ohio, have invented a new and useful Improvement in Electrically-Heated Bake-Ovens, of which the following is a specification.

My invention relates to electrically-heated apparatus and particularly to electrically-heated reel-type bake ovens, and it has for its object to provide a new form and location of an electrical heating element for such an oven.

Heretofore, the heating element has been placed at or near the bottom of the casing and the resulting convection currents of air were relied upon to heat evenly the entire volume of the oven and also to properly bake the articles of food placed therein. Under such conditions of heating, there is danger of overheating the bottom of an article placed on the revolving tray and of burning the sides of the articles, while the top thereof may not be sufficiently baked.

In practising my invention, I provide an electric heating element, substantially circular or ovate in lateral cross-section, located inside of the path of travel of the trays of a reel-type bake oven. The heating element, which may be of any desired construction, as regards the form of resistor, is suitably mounted on the revolving shaft inside of the trays, and is provided with means for conducting the current thereto from a point outside of the casing.

Figure 1:
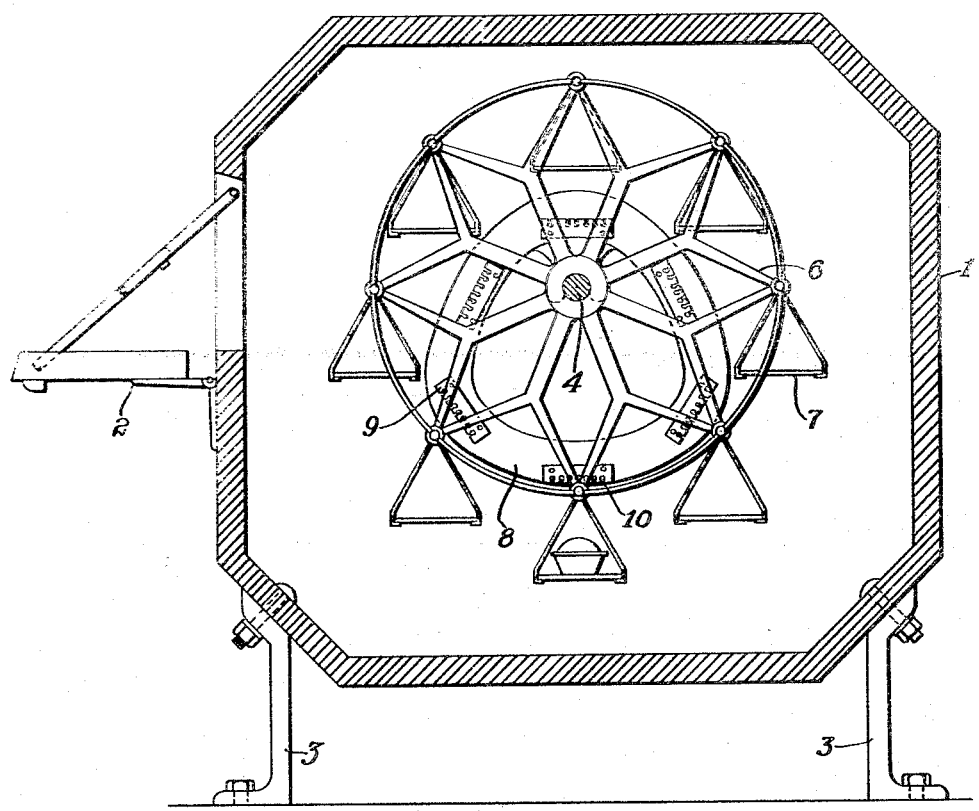
Figure 2:
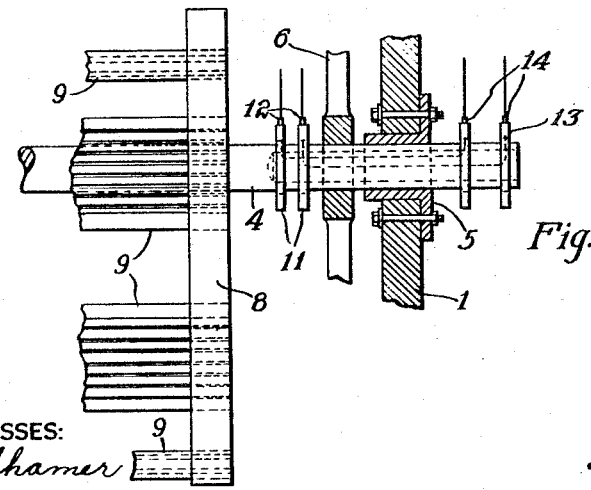

In the single sheet of drawings,

Figure 1 is a view, partly in cross-section and partly in side elevation, of a reel-type bake oven provided with a heating element embodying my invention, and Fig. 2 is a detail view of a portion of the oven showing the method of connecting the resistor to the electrical supply circuit.

A casing 1, which is shown diagrammatically only in Fig. 1, may be made up in any suitable or desired manner as is usual in such structures. It is here intended to represent the casing as comprising suitable inner and outer walls between which may be placed heat-insulating material. A suitable door 2 is provided through which the material to be baked may be placed inside of the oven or removed therefrom. Suitable supporting members 3 are indicated as being provided to support the casing 1 on a floor.

A shaft 4 is provided and may operate in suitable bearing members 5, as shown in Fig. 2. A plurality of reel arms 6 is provided, suitably spaced apart upon the shaft 4 and secured thereto so that the arms may rotate with the shaft when the same is driven by some suitable means (not shown). A plurality of shelves or trays 7 is provided, suitably connected to the reel arms 6 so that they will retain their substantially horizontal position throughout the rotation of the shaft and of the reel arms.

A plurality of suitable resistor-supporting frames 8, which may be either substantially circular or ovate in lateral cross-section, are provided and are so arranged as to rest upon, and be carried by, the rotatable shaft 4. Suitable resistor-supporting members 9 are provided and may be of any desired form, but are here shown as comprising refractory members 9 substantially rectangular in cross-section and having a number of parallel-extending resistor-supporting grooves 10 in the outer face thereof. A suitable resistor may be located in these grooves, and electrical connection may be made by means of suitably insulated slip rings 11 mounted on the shaft and stationary contact members 12 operatively engaging the slip rings 11. These slip rings 11 may be electrically connected to a second set of slip rings 13 located on the outside of the casing 1, and connection may be made to a suitable source of electrical energy by means of stationary brushes 14. If the frames 8 are ovate in lateral cross-section, they are intended to be stationary in the casing 1. If the frames 8 are substantially circular in lateral cross-section, they may rotate with the shaft 4 and, in this case, the slip rings 11 and the contact members 12 are not required.

It will be seen by reference to the position of the various trays 7, as shown in Fig. 1, that the area inclosed by the trays and their suspension points is substantially ovate in form and that the general lateral contour of my improved electrical heater may also be substantially ovate in form. I may provide a greater amount of heat at or near the bottom of the heater than at the top thereof so as to balance, to some extent, the natural tendency of the heat to rise by reason of the convection currents of air.

It may be noted that substantially all of the heat generated by the heating element must traverse the path of travel of the material being baked and, further, that the heat is applied to all sides of the material so that a better finished product may be expected.

Various modifications of the device embodying my invention may be made without departing from the spirit and scope of my invention, and I desire that only such limitations shall be placed thereon as are imposed by the prior art or are specifically set forth in the appended claims.

I claim as my invention:

1. In a baking oven of the reel type, the combination with an outer casing, a shaft therein, a rotatable reel secured to said shaft, and a plurality of spaced trays secured to said reel, of electric heating means located inside of the path of travel of said trays.

2. In a baking oven of the reel type, the combination with an outer casing, a shaft therein, a rotatable reel secured to said shaft and a plurality of spaced trays secured to said reel, of electric heating means located substantially contiguous to and inside of the path of travel of said trays.

3. In a baking oven of the reel type, the combination with an outer casing, a shaft therein, a rotatable reel secured to said shaft and a plurality of spaced shelves secured to said reel, of a supporting member substantially ovate in cross-section mounted on said shaft inside of said reel and shelf structure and electric heating means secured to said supporting member.

4. In a baking oven of the reel type, the combination with an outer casing, a shaft therein, a rotatable reel secured to said shaft and a plurality of spaced shelves secured to said reel, of an electric heating means substantially ovate in cross-section located inside of the path of travel of said shelves and adapted to heat successively all sides of articles placed on said shelves.

5. In a baking oven of the reel type, the combination with an outer casing, a shaft therein, a rotatable reel secured to said shaft and a plurality of spaced shelves secured to said reel, of electric heating means supported by said shaft contiguous to and inside of the path of travel of said shelves.

In testimony whereof, I have hereunto subscribed my name this 15th day of Sept. 1920.

JAMES C. WOODSON.